(12) United States Patent
Kishi et al.

(10) Patent No.: US 8,001,340 B2
(45) Date of Patent: *Aug. 16, 2011

(54) METHOD FOR DETERMINING ALLOCATION OF TAPE DRIVE RESOURCES FOR A SECURE DATA ERASE PROCESS

(75) Inventors: Gregory Tad Kishi, Oro Valley, AZ (US); Mark Allan Norman, Tucson, AZ (US); Laura Jean Ostasiewski, Tucson, AZ (US); Christopher Michael Sansone, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 715 days.

This patent is subject to a terminal disclaimer.

(21) Appl. No.: 11/737,736

(22) Filed: Apr. 19, 2007

(65) Prior Publication Data

US 2008/0263294 A1 Oct. 23, 2008

(51) Int. Cl.
G06F 12/02 (2006.01)
G06F 13/00 (2006.01)

(52) U.S. Cl. ........ 711/159; 711/100; 711/154; 711/170; 711/200

(58) Field of Classification Search .................. 711/159, 711/1, 3, 6, 100, 101–118, 133, 154, 200, 711/202, 203; 717/168–178
See application file for complete search history.

(56) References Cited

U.S. PATENT DOCUMENTS

| 4,233,638 | A | 11/1980 | Bolick et al. ............... 360/92 |
| 4,961,116 | A | 10/1990 | Kanamaru et al. ........... 358/343 |
| 5,218,543 | A | 6/1993 | Komatsu ..................... 364/424 |
| 5,337,275 | A | 8/1994 | Garner ........................ 365/189 |
| 5,517,321 | A | 5/1996 | Yoshida ....................... 358/335 |
| 6,405,284 | B1 * | 6/2002 | Bridge ......................... 711/114 |
| 6,856,754 | B2 | 2/2005 | Sameshima et al. .......... 386/46 |
| 6,868,478 | B2 * | 3/2005 | Kishi et al. .................. 711/113 |
| 6,954,831 | B2 * | 10/2005 | Carlson et al. .............. 711/154 |
| 2003/0166399 | A1 * | 9/2003 | Tokkonen et al. ............ 455/419 |
| 2003/0196036 | A1 * | 10/2003 | Gibble et al. ................ 711/111 |
| 2006/0117136 | A1 * | 6/2006 | Tran et al. ................... 711/112 |

OTHER PUBLICATIONS

Load Balancing Using Periodic Iterations and Weighted Averages, IBM Technical Disclosure Bulletin NN82034936, IBM, Mar. 1982.*
File System Design with Assured Delete; Perlman, Radia; Proceedings of the Third IEEE Internation Security in Storage Workshop (SISW'05); IEEE; Dec. 13, 2005.*
Scrubbing Stubborn Data: an Evaluation of Counter-Forensic Privacy Tools; Geiger, Matthew et al.; IEEE Security & Privacy; vol. 4, No. 5, p. 16-25; Sep. 10, 2006.*
Load Balancing Using Periodic Iterations and Weighted Averages, IBM Technical Disclosure Bulletin NN82034936, IBM, Mar. 1982.*
The IBM Magstar Virtual Tape Server and Enhancements to Magstar: New Era in Tape; IBM; Nov. 1996.*

(Continued)

*Primary Examiner* — Tuan V. Thai
(74) *Attorney, Agent, or Firm* — Zilka-Kotab, PC

(57) ABSTRACT

A method and computer program product are provided to ensure a timely secure data erase by determining whether allocating an additional tape drive would improve secure data erase performance by evaluating a quantity of physical volumes to be secure data erased, a maximum queued threshold, an average time to an erasure deadline and a minimum expiration threshold. An additional tape drive is allocated for the secure data erase process when it is determined that allocating an additional tape drive would improve secure data erase performance.

17 Claims, 4 Drawing Sheets

OTHER PUBLICATIONS

Scrubbing Stubborn Data: an Evaluation of Counter-Forensic Privacy Tools; Geiger, Matthew et al.; IEEE Security & Privacy; vol. 4, No. 5, p. 16-25; Sep. 10, 2006.*

IBM TotalStorage Virtual Tape Server: Planning, Implementing, and Monitoring; Haeusser et al.; IBM; Nov. 2005.*

Kishi, et al., 'Method for Selectively Performing a Secure Data Erase to Ensure Timely Erasure', Apr. 19, 2007, pp. 1-39 (includes 4 pgs. of figures), (filed Apr. 19, 2007).

Kishi, et al., 'System for Selectively Performing a Secure Data Erase to Ensure Timely Erasure', Apr. 19, 2007, pp. 1-37 (includes 4 pgs. of figures), (filed Apr. 19, 2007).

Kishi, et al., 'System for Determining Allocation of Tape Drive Resources for a Secure Data Erase Process', Apr. 19, 2007, pp. 1-39 (includes 4 pgs. of figures), (filed Apr. 19, 2007).

Final Office Action Summary from U.S. Appl. No. 11/737,728 dated Feb. 7, 2011.

Final Office Action Summary from U.S. Appl. No. 11/737,732 dated Feb. 7, 2011.

Final Office Action Summary from U.S. Appl. No. 11/737,739 mailed on Aug. 19, 2010.

Advisory Action Summary from U.S. Appl. No. 11/737,732 mailed on Jun. 18, 2010.

Non-Final Office Action Summary from U.S. Appl. No. 11/737,732 mailed on Aug. 27, 2010.

Non-Final Office Action Summary from U.S. Appl. No. 11/737,728 mailed on Aug. 27, 2010.

* cited by examiner

METHOD FOR DETERMINING ALLOCATION OF TAPE DRIVE RESOURCES FOR A SECURE DATA ERASE PROCESS

CROSS REFERENCE TO RELATED APPLICATION

The present application is related to U.S. patent application Ser. No. 11/737,739, "System for Determining Allocation of Tape Drive Resources for a Secure Data Erase Process," filed Apr. 19, 2007, and naming Kishi et al. as inventors.

TECHNICAL FIELD

The disclosure relates generally to automated data storage systems and more particularly, to a method for selectively performing a secure data erase.

BACKGROUND OF THE INVENTION

A virtual tape system is a tape management system such as a special storage device or group of devices and software which manages data such that the data appears to be stored entirely on tape cartridges when portions of the data may actually be located in faster, hard disk storage. Programming for a virtual tape system is sometimes referred to as virtual tape server (VTS), although these terms may be used interchangeably, unless otherwise specifically indicated. A virtual tape system may be used with hierarchical storage management (HSM) system in which data is moved as the data falls through various usage thresholds to slower but less costly forms of storage media. A virtual tape system may also be used as part of a storage area network (SAN) where less-frequently used or archived data can be managed by a single virtual tape server for a number of networked computers.

In prior art virtual tape storage systems, such as International Business Machines (IBM) MAGSTAR Virtual Tape Server, at least one virtual tape server (VTS) is coupled to a tape library comprising numerous tape drives and tape cartridges. The VTS is also coupled to a direct access storage device (DASD), comprised of numerous interconnected hard disk drives.

The DASD functions as a tape volume cache (TVC) of the VTS subsystem. When using a VTS, the host application writes tape data to virtual drives. The volumes written by the host system are physically stored in the tape volume cache (e.g., a RAID disk buffer) and are called virtual volumes. The storage management software within the VTS copies the virtual volumes in the TVC to the physical cartridges owned by the VTS subsystem. Once a virtual volume is copied or migrated from the TVC to tape, the virtual volume is then called a logical volume. As virtual volumes are copied from the TVC to a MAGSTAR cartridge (tape), they are copied on the cartridge end to end, taking up only the space written by the host application. This arrangement maximizes utilization of a cartridge storage capacity.

The storage management software manages the location of the logical volumes on the physical cartridges, and the customer has no control over the location of the data. When a logical volume is copied from a physical cartridge to the TVC, the process is called recall and the volume becomes a virtual volume again. The host cannot distinguish between physical and virtual volumes, or physical and virtual drives. Thus, the host treats the virtual volumes and virtual drives as actual cartridges and drives and all host interaction with tape data in a VTS subsystem is through virtual volumes and virtual tape drives.

One issue of VTS systems is the management of data within the tapes. The VTS system may have a number of duplicate, invalid, latent or unused copies of data. After a virtual tape volume is created and/or modified (one or more records are written to the volume) and closed, the virtual tape volume is copied onto the physical tape (logical) volume. The image of the virtual volume copied to a physical volume when the virtual volume was closed is a complete version of the virtual volume at the point in time the virtual volume was closed. If a virtual volume is subsequently opened and modified, when the virtual volume is closed, that image of the virtual volume is also copied onto physical tape, however the virtual volume does not overwrite the prior version of the volume since the virtual volume may have a different size than the previous version. So at any point in time, there may be several versions of the same volume serial number that reside on one or more physical tape volumes.

Moreover, physical volumes within a VTS are arranged in groups that are called "pools," with each physical volume including one or more logical volumes. Each of the physical volumes managed by the VTS system is assigned to one of 32 pools, for example. It is understood that each pool of physical volumes is assigned a name and may have one or more parameters associated therewith. For example, typical parameters associated with a pool include, but are not limited to: a media type (e.g. physical volumes having 10 Gbyte tape or 20 Gbyte tape); and a rule(s) for managing volumes in a pool. One rule may involve the concept of "reclamation" whereby the VTS monitors what percentage of data associated in a particular physical volume is still valid. That is, over time, data space occupied by a logical volume needs to be reclaimed from a physical volume when the data is no longer used or needed by the host, i.e., has expired. Thus, if any volume(s) in the pool falls below a reclaim percent threshold, then a reclamation process will be performed to take the valid logical volume(s) off the physical volume and put the valid logical volume on another physical volume-potentially combining multiple partially full physical volumes and filling up the other.

If a virtual volume is removed from the physical volume and put on to another physical volume, the data on the first physical volume is deleted but has not been overwritten, and thus, the data may be recovered. Further, data associated with the most current version of a virtual volume may be expired or considered latent or unusable by the customer, but the virtual volume still will exist on the physical tape volume and could be accessed.

Recently, enterprises have become more dependent on the ability to store, organize, manage and distribute data. Accordingly, "information life-cycle management," the process of managing business data from conception until disposal in a manner that optimizes storage, access, and cost characteristics has become increasingly important. In particular, the significance of how data is "deleted" or disposed of has increased as confidential data has begun to play a more vital role in business transactions and stricter regulations are imposed on maintaining customer privacy.

To protect confidential or sensitive data (e.g., credit card information, social security number) and to maintain customer privacy it is advantageous to perform a secure data erase on certain data so that the data is unrecoverable. A secure data erase is defined herein rendering data permanently unreadable by any reasonable means. Prior art methods of prioritizing data to be securely erased are performed by a first in, first out priority basis, ensuring that the physical volume that was first added to the queue for secure data erase is secure data erased first. For example, in the prior art method the process to determine which physical volume should be secure data erased next looped through each pool of physical volumes beginning with pool 1 and continuing through all pools to the last pool (e.g. pool 32). Therefore, the list or queue of physical volumes to secure data erase is created by evaluating and listing all of the physical volumes within pool 1 to be secure data erased, then evaluating and listing all of the physical volumes within pool 2 to be secure data erased, and so on, continuing to the last pool (e.g. pool 32), until all of the physical volumes in all the pools that require secure data erase are evaluated and listed on the queue. The secure data erase process is then initiated, and with a first in, first out process the prior art process begins with a secure data erase of the physical volumes in the order that they are listed in the queue. Thus, the VTS performs a first secure data erase on those physical volumes that are in pool 1, then when the physical volumes within pool 1 are secure data erased, the VTS begins secure data erase on the physical volumes within pool 2, and so on, continuing until the process reaches the last pool (e.g. pool 32).

The prior art process as described is sufficient provided the VTS can manage all of the physical volumes to be secure data erased within the time remaining to the erasure deadline or there is no backlog of physical volumes to be secure data erased. In reality the VTS system can become overloaded and, for example, while a physical volume within pool 23 is being secure data erased a physical volume within pool 32 may pass its secure data erase (SDE) deadline. Therefore, physical volumes that have the shortest remaining time to the SDE deadline may be overlooked or postponed. This could put long-expired physical volumes which may contain sensitive data (e.g., credit card information, social security number) at risk for being accessed and retained.

Therefore, it would be advantageous to have a VTS system that gives priority for secure data erase to physical volumes closest to their SDE deadline. Thus, what is needed is a method and a system that guarantees that old or expired versions of a virtual volume cannot be accessed after a certain time interval (e.g. a grace period), through any reasonable means.

SUMMARY OF THE INVENTION

The significance of how data is "deleted" or disposed of has increased as confidential data has begun to play a more vital role in business transactions and stricter regulations are imposed on maintaining customer privacy. To protect confidential or sensitive data (e.g., credit card information, social security number) and to maintain customer privacy it is advantageous to perform a secure data erase on certain data so that it is unrecoverable after a certain time interval (e.g. a grace period), through any reasonable means. Accordingly, one aspect of the present invention provides a method and computer program product to ensure a timely secure data erase by allocating an additional tape drive for the secure data erase process when it is determined that the allocation an additional tape drive would improve secure data erase performance. Determining whether allocating an additional tape drive would improve secure data erase performance is completed by evaluating a quantity of physical volumes to be secure data erased, a maximum queued threshold, an average time to an erasure deadline and a minimum expiration threshold.

Specifically, in one embodiment, the evaluation includes comparing the quantity of physical volumes to be secure data erased to the maximum queued threshold and in response to the quantity of physical volumes to be secure data erased being greater than the maximum queued threshold, calculating an average time to the erasure deadline. The evaluation continues by comparing the average time to the erasure deadline to the minimum expiration threshold, and allocating an additional tape drive to the secure data erase process in response to the average time to the erasure deadline being less than the minimum expiration threshold. In one embodiment improved performance includes performing the secure data erasure before a secure data erasure deadline.

In one embodiment the quantity of physical volumes to be secure data erased is determined by a physical volume erase count which may be determined by incrementing a count for each physical volume that has a remaining time less than a time threshold. Further, the remaining time may be calculated by a difference between the erasure deadline of the physical volume and a current date of the physical volume.

In accordance with one embodiment of the present invention the secure data erase may be accomplished by overwriting data of the physical volume one or more times utilizing a data pattern that contains one of logical ones, zeroes, or some combination thereof.

In one embodiment the one or more existing tape drives (tape drives allocated to the secure data erase process) may be reallocated such that one or more previous additional allocated resources (e.g. tape drive(s)) may be removed, one or more additional resources (e.g. tape drive(s)) may be added, or the resources may be set back to the minimum requirement depending on another evaluation of the quantity of physical volumes to be secure data erased, the maximum queued threshold, and a minimum queued threshold.

Finally, in one embodiment, the optimum number of tape drives is determined for a secure data erase process by an evaluation of a quantity of physical volumes to be secure data erased, a maximum queued threshold, an average time to an erasure deadline, and a minimum expiration threshold. In response to this evaluation the optimum number of tape drives are allocated for the secure data erase process.

DETAILED DESCRIPTION OF THE PREFERRED EMBODIMENTS

The following is intended to provide a detailed description of an example of the invention and should not be taken to be limiting of the invention itself. Rather, any number of variations may fall within the scope of the invention which is defined in the claims following the description.

The present disclosure allows for a method to ensure a timely secure data erase by giving priority for secure data erase to the physical volumes closest to their secure data erase deadline. Moreover, in one embodiment, the present disclosure ensures timely secure data erase by allocating more tape drive devices to aid in the secure data erase process when it is determined that the current allocation will not be able to meet the secure data erase demand. Finally, in a further embodiment, the present disclosure provides a process to return to a minimum allocation of tape drives when the minimum allocation of tape drives will be able to meet the secure data erase demand.

While the tape management system is referred to herein as a Virtual Tape System (VTS), a VTS is only one example of a tape management system. As would be understood by one of ordinary skill in the art the present disclosure applies to any tape management system, such as a tape library and virtual tape software etc.

Figure 1:
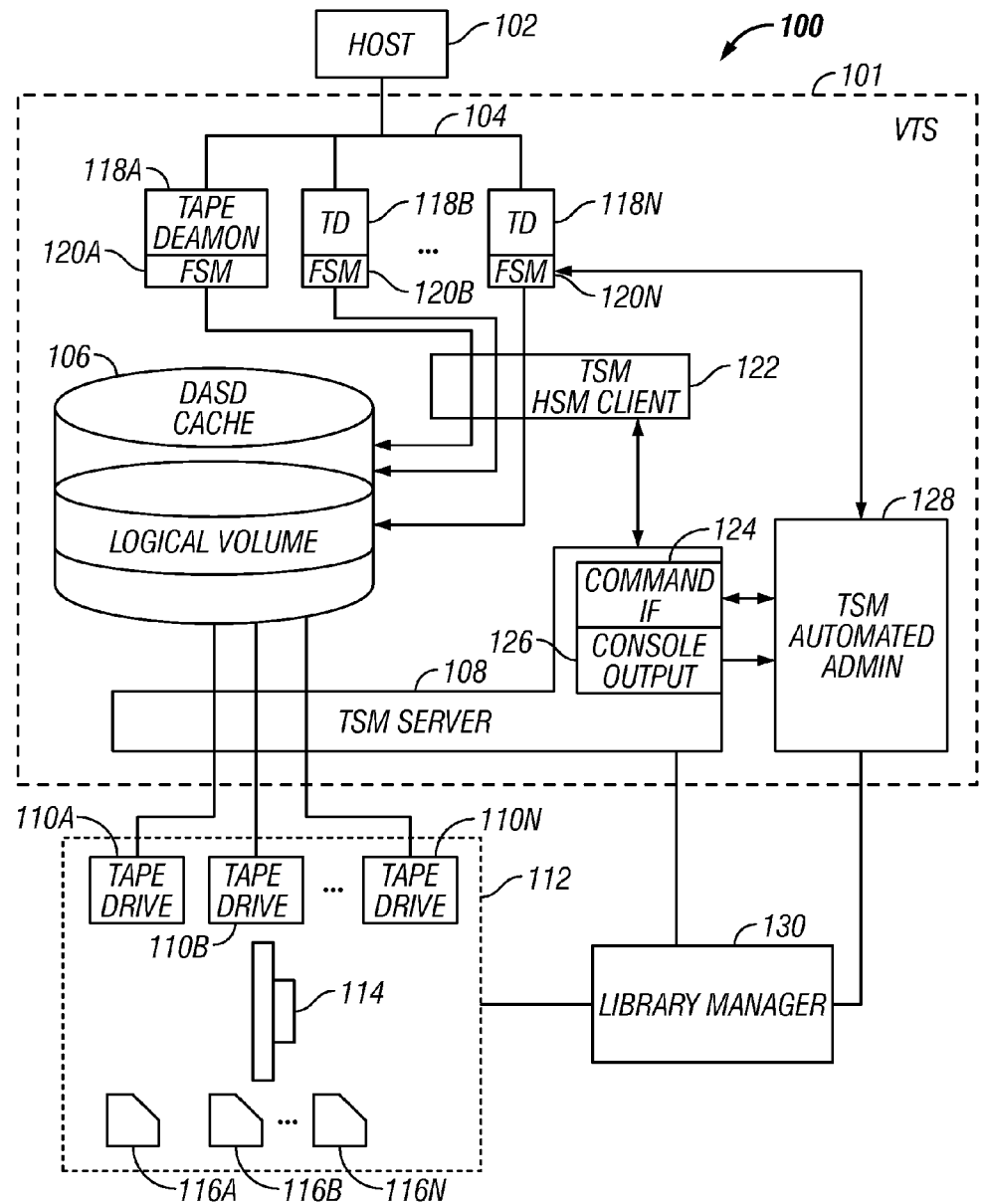
FIG. 1 illustrates a detailed block diagram of a data storage network including a data storage subsystem according to an embodiment of the present disclosure.

With reference now to FIG. 1, there is depicted a block diagram of an exemplary virtual storage system 100 that provides a suitable environment for the practice of the present disclosure. Virtual storage system 100 includes a virtual tape server 101, a tape library 112, and a library manager 130. A host system 102 is linked to the virtual tape server 101 via a network connection, e.g. TCP/IP, LAN, Ethernet, and the IBM Enterprise System Connection (ESCON) (not shown). In one embodiment, host system 102 is a computer, such as a personal computer, workstation or mainframe that is linked to the virtual tape server 101 via an ESCON channel. Virtual tape server 101, in one embodiment, is a computer including a processor, such as a personal computer, workstation or mainframe and is associated with a Direct Access Storage Device (DASD) cache 106. The DASD cache 106 preferably includes one or more logical volumes. In one embodiment, DASD cache 106 includes a plurality of hard disks that are spaced into redundant array of inexpensive disk (RAID) arrays.

Tape library 112 includes a plurality of tape drives 110, generally designated tape drives 110A, 110B . . . 110N, such as International Business Machine (IBM), TS1100 or JAGUAR 3592 tape drives or any other tape drive known in the art. Generally, a removable storage volume, e.g., a tape cartridge 116A, 116B, . . . 116N, is loaded into each of the tape drives. Tape storage drives 110 are serviced by an accessor (e.g., a robot) 114 which transfers selected tape cartridges 116A, 116B, . . . 116N between tape storage drives 110 and their corresponding positions within a tape cartridge repository.

It will be noted that the variable identifier "N" is used in several instances in FIG. 1 to more simply designate the final element (e.g., tape drives, 110A, 110B . . . 110N, and tape cartridges, 116A, 116B, . . . 116N) of a series of related or similar elements (e.g., tape drives and tape cartridges). The repeated use of such variable identifiers is not meant to imply a correlation between the sizes of such series of elements, although such correlation may exist. The use of such variable identifiers does not require that the series of elements has the same number of elements as another series delimited by the same variable identifier. Rather, in each instance of use, the variable identified by "N" may hold the same or a different value than other instances of the same variable identifier.

Tape library 112 typically includes storage management software utilized to monitor the active space on the tape cartridges and schedule reclamations of tape cartridges when the system is less active. In one embodiment, tape library 112 is a tape library system such as the IBM Virtualization Engine TS 7740 and IBM MAGSTAR 3494 Tape Library. Library manager 130 is utilized in virtual storage system 100 to install, maintain, configure, and operate tape library 112. Within automated library 112, accessor 114 may be controlled utilizing a library manager 130 based upon inputs received from storage management server 108 and/or an automated storage management administrator 128.

DASD cache 106 that includes, in one embodiment, a tape volume cache, provides a cache for data stored in tape library 112. DASD cache 106 maintains logical volumes as logical volume files that are concatenated into physical volume files in the tape cartridges loaded in the tape drives located within tape library 112. When a logical volume file in DASD cache 106 moves to a tape drive in a tape library 112, the logical volume file is written to a physical volume file on a tape cartridge in the actual tape drive. When a physical volume file is recalled for a tape drive and moved to DASD cache 106, the physical volume file then becomes a logical volume file in the DASD cache 106. In this way, DASD cache 106 provides a window to host system 102 of all the physical volume files in tape library 112.

Virtual tape data storage system includes a plurality of virtual tape daemons, generally designated as tape daemons 118A, 118B, . . . 118N, that represent and emulate virtual tape devices to host system 102. Host system's 102 operating system, in turn, manages the presentation of the virtual tape devices to the systems users (not shown). Host system 102 views the virtual tape devices as actual drives and when host system 102 attempts to access a logical volume in a selected virtual tape device, the respective virtual tape daemon associated with the virtual tape device requested by the host system 102 will handle the host access request.

Host-to-DASD cache data transfer in the illustrated virtual tape data storage subsystem may be controlled by VTS code via a process such as a hierarchical storage manager (HSM) client 122. For example, a HSM client 122 within virtual storage system 100 intercepts and processes the access request from the virtual tape daemons 118A, 118B, . . . 118N. HSM client 122 then carries out host system 102 request to access the logical volume file on DASD cache 106. In one embodiment, host-to-DASD cache data transfer is directly controlled by a file system manager (FSM) 120A, 120B, . . . 120N which handles DASD read and write commands.

Similarly, an interface between the DASD cache 106 and the tape storage drive 110 may be controlled by storage management server 108. For example, if HSM client 122 attempts to mount a logical volume file that is not located in DASD cache 106, HSM client 122 will communicate the access request to the storage manager server 108. If the tape in the access request is already mounted in a tape drive in tape library 112, storage manager server 108 will access the physical volume for the requested logical volume file from the mounted tape. However, if the requested file on a tape is not presently mounted in a tape drive, the storage manage server 108 will initiate a request to library manger 130 to mount the tape containing the physical volume corresponding to the requested logical volume file.

Examples of a storage management processing module which could be used as storage management server 108 and HSM client 122 are the Tivoli Storage Manager (TSM) application and IBM ADSTAR Distributed Storage Manager (ASDM) product, both of which are provided by International Business Machines Corporation of Armonk, N.Y. In data storage network 100, storage management server 108 includes a command interface 124 and a console output 126.

In a one embodiment, storage manager server 108 migrates entire logical volume files from DASD cache 106 to tape library 112. When the available space in DASD cache 106 reaches a predetermined level or after a predetermined time period, and automated storage management administrator 128 will direct storage manager server 108 to migrate logical volume files from DASD cache 106 to tape library 112 for archival therein. Typically, automated storage management administrator 128 stores information associated with the physical volumes in an associated volume status table (not shown). According to one embodiment, automated storage management administrator 128 provides functionality needed to achieve the secure data erase process of the present disclosure, and additionally performs many VTS specific administrative functions utilizing storage management server 108. For example, automated storage management administrator 128 may include a secure data erase processing module.

The requirement that the old version(s) of the VTS volume must be handled to guarantee that they cannot be recovered is met by overwriting a physical volume that contains invalidated virtual volume data within a certain time interval (i.e. grace period) specified by the customer. Thus, there is introduced a function, implemented by the VTS, and particularly, the automated storage management administrator 128 component of the VTS, for enabling data associated with a virtual or logical volume to be invalidated. A physical volume and its associated data may be secure data erased (i.e., rendered permanently unreadable by any reasonable means) by overwriting all data of the physical volume one or more times utilizing a predetermined file or data pattern (e.g., logical ones, zeroes, some combination thereof). Techniques for the secure data erase process may be user or host-selectable (e.g., based upon a desired level of security) or automatically determined. The overwriting may be performed by one of the tape drives 110A, 110B . . . 110N.

An expiration time is provided at which the data on a physical volume is invalid, latent or unused. The data may become invalid, latent, or unused by reclamation, migration or modification, for example, as described above. The expiration time may be a date, or a date and a time of day, at which the data is not longer valid or useful, and hereinafter will be referred to as the expiration date. A secure data erasure (SDE) deadline is set for each physical volume of a plurality of physical volumes after a certain time interval (i.e. grace period) after the expiration date and may be set by the customer (e.g. customer secure data erasure deadline). The SDE deadline is the date at which the secure data erase must be performed to avoid retention of unwanted data. It is advantageous to perform a secure data erase within a certain time interval (i.e. a grace period) from the expiration time to ensure that confidential data and customer information will be kept for a required period of time, but cannot be recovered by any reasonable means after the required period of time. For example, documents such as bank records and credit card information may be required to be held for a certain time interval (i.e. grace period) by law. However, after this required time interval (i.e. grace period) has passed it is advantageous for the company to secure data erase the information, such that the information is no longer recoverable. Thus, for a given pool, it is desired to ensure that after a certain time interval (i.e. grace period), expired data on a physical volume is no longer accessible through any normal means, such as by overwriting the expired data.

Figure 2:
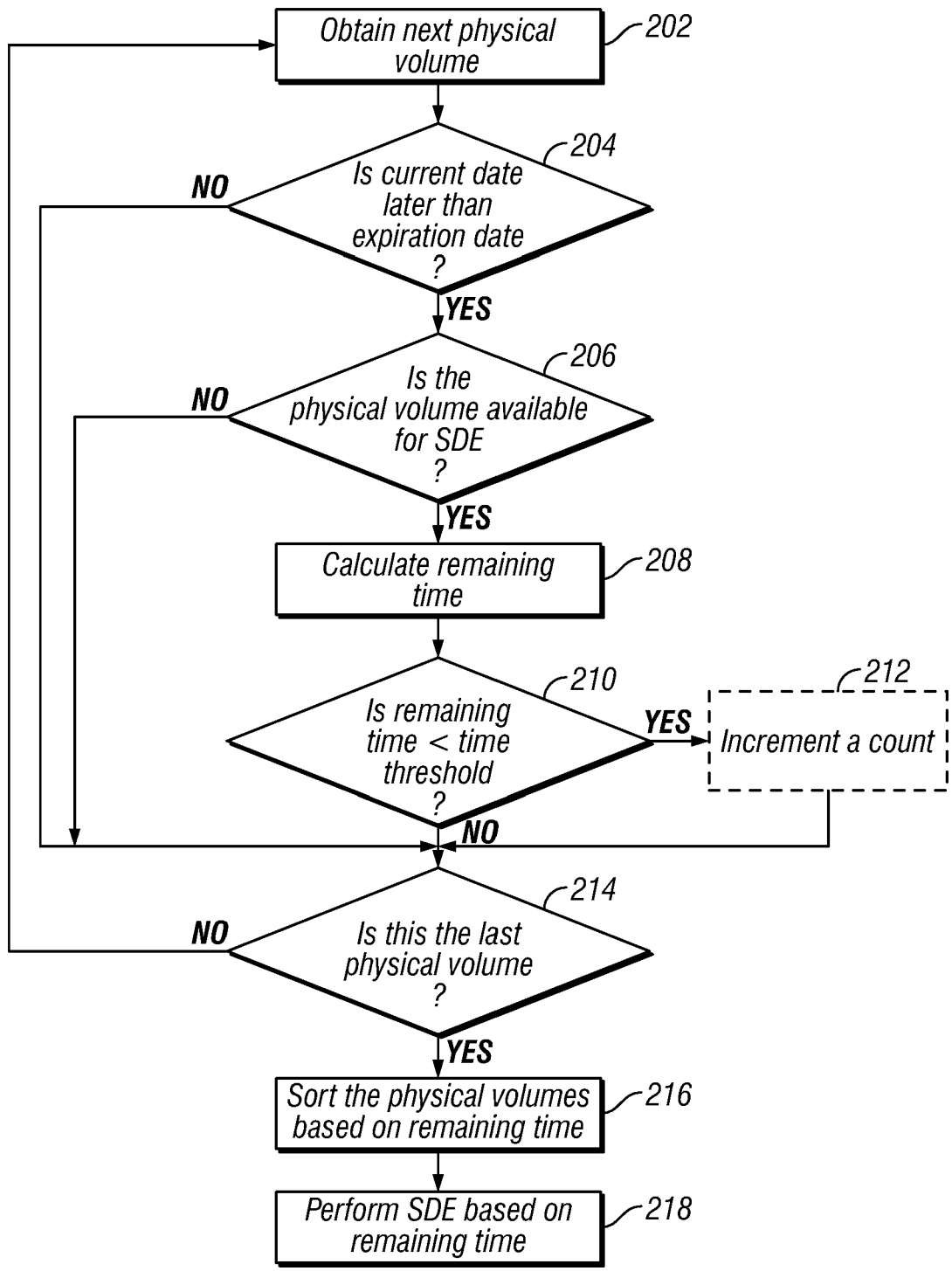
FIG. 2 illustrates a flow diagram of method to selectively perform a secure data erase in accordance with one embodiment of the present disclosure.

FIG. 2 discloses a process that periodically determines which of the physical volumes managed by the VTS should be the next physical volume to be securely data erased. For purposes of discussion, it is assumed that this process is machine executed instructions executed by the VTS (on a daily basis, e.g., every 24 hours, etc. however, the process may be performed every 12 hours, or any granularity as appropriate). As shown in FIG. 2, the process begins at step 202 where the VTS obtains a physical volume (or the next physical volume) to evaluate the requirements for secure data erasure.

Figure 3:
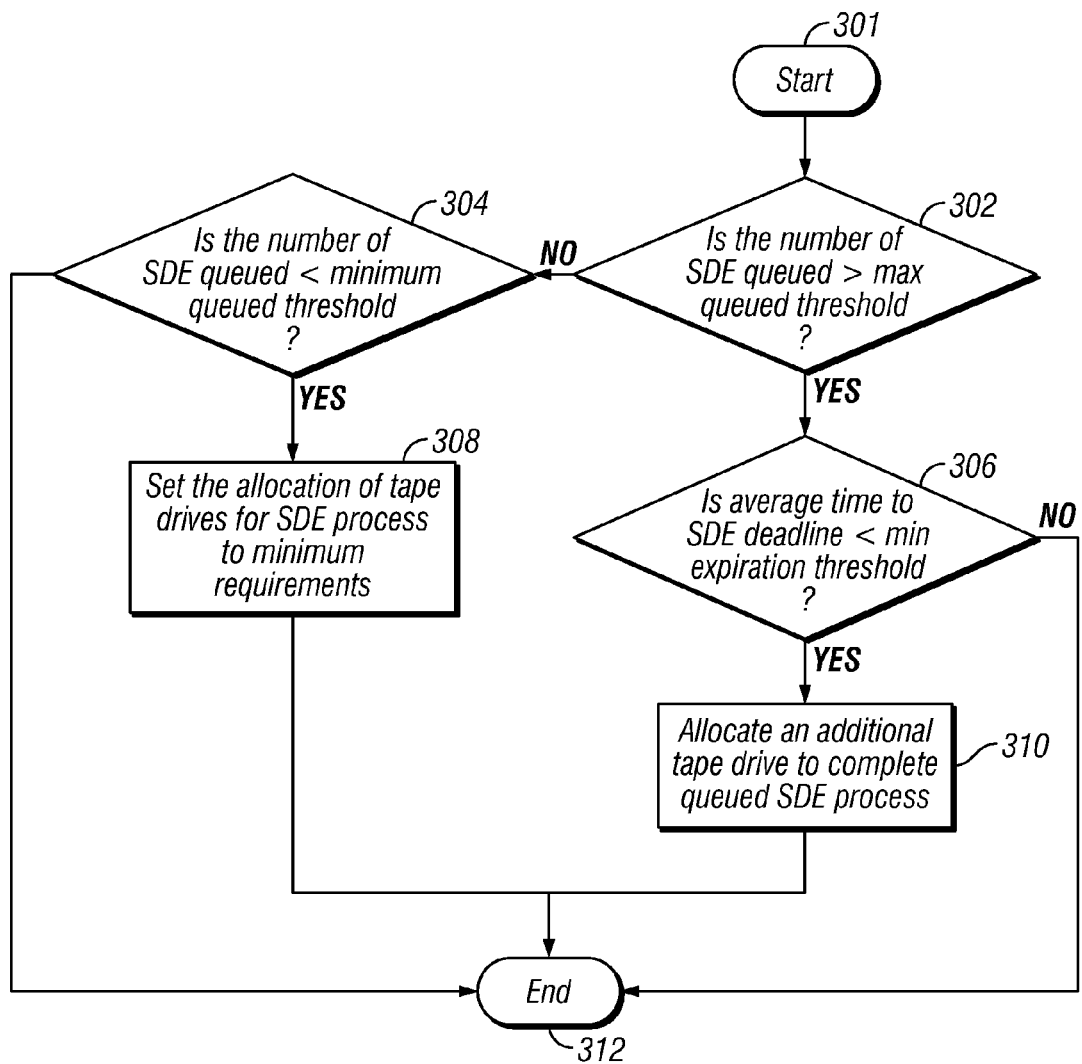
FIG. 3 illustrates a flow diagram of a method to evaluate the allocation of resources for secure data erase in accordance with another embodiment of the present disclosure.

While it is described that the VTS performs various functions during the process disclosed in FIG. 2 and FIG. 3 it is understood by one of ordinary skill in the art that it may be the application running on the processor of the VTS such as the direct storage manager server 108 (e.g. TSM server), HSM client 122 (e.g. TSM HSM client), or the automated storage management administrator 128 (e.g. TSM automated administrator) that may perform these functions.

In step 204, the VTS determines if the current date is later than an expiration date of the selected physical volume. The expiration date of a physical volume is defined as the time and/or date when the data contained within the physical volume is considered invalid, latent, or no longer useful.

If a determination is made that the current date is not later than the expiration date then the process proceeds to process block 214. In process block 214 the VTS (e.g. an application running on the processor such as the direct storage manager server 108, HSM client 122, or automated storage management administrator 128) determines if the physical volume currently being evaluated is the last physical volume. In the case where the physical volume currently being evaluated is the last physical volume then the process continues on to step 216. If it is determined that the physical volume currently being evaluated is not the last physical volume then the process proceeds to step 202, wherein the VTS obtains the next physical volume to evaluate.

However, if it is determined that the current date is later than the expiration date the process proceeds to step 206, wherein the VTS determines whether or not the physical volume is available for secure data erase. The VTS may determine whether or not the physical volume is available for secure data erase based on a number of factors. For example, a physical volume will not be available for secure data erase if the physical volume is currently being filled with additional data or if the physical volume or portions of the physical volume are being read etc.

If it is determined that the physical volume is not available for secure data erase the process continues to process block 214. In process block 214 the VTS determines if the physical volume currently being evaluated is the last physical volume. In the case where the physical volume currently being evaluated is the last physical volume then the process continues on to step 216. If it is determined that the physical volume currently being evaluated is not the last physical volume then the process proceeds to step 202, wherein the VTS obtains the next physical volume to evaluate.

If it is determined in step 206 that the physical volume is available for secure data erase the process continues to step 208 in which the VTS calculates the remaining time. The remaining time can be defined as the time remaining between the current date (e.g. today's date and/or time) to the secure data erasure (SDE) deadline. The remaining time is calculated by the difference between the SDE deadline and the current date. For example, if the SDE deadline as Jul. 26, 2006 and the current date is Jul. 11, 2006, the calculated remaining time would be 15 days. One of ordinary skill in the art would understand that the remaining time may be expressed in days, hours, minutes or seconds, as appropriate.

In step 210, the VTS compares the remaining time to a time threshold. The time threshold is a time period that may be defined by the customer. The time threshold, in one embodiment, may be a time period that the customer determines is close enough to the SDE deadline that secure data erasure of the physical volume is warranted. For example, one customer may define a time threshold of 10 days from the SDE deadline, while another customer may define a time threshold of 5 days from the SDE deadline.

If the VTS determines that the remaining time is greater than the time threshold then the process continues to step 214. In step 214 the VTS determines if the physical volume currently being evaluated is the last physical volume. In the case where the physical volume currently being evaluated is the last physical volume then the process continues on to step 216. If it is determined that the physical volume currently being evaluated is not the last physical volume then the process proceeds to step 202, wherein the VTS obtains the next physical volume to evaluate.

In one embodiment, in addition to the steps described above, if it is determined that the remaining time is less than a time threshold the process continues to step 212 wherein the VTS increments a count. The incrementing of a count allows for a record of the quantity of physical volumes to be secure data erased (physical volumes queued for secure data erasure) that are currently expired, are available for secure data erasure, and that have a remaining time that is less than the customer defined time threshold. The record of the quantity of physical volumes to be secure data erased (e.g. a physical volume erase count) may be advantageous for determining allocation of additional resources for the secure data erase process, as discussed below with respect to another embodiment of the present disclosure.

Following step 212, the process continues to step 214. In process block 214 the VTS determines if the physical volume currently being evaluated is the last physical volume. In the case where the physical volume being evaluated is the last physical volume then the process continues on to step 216. If it is determined that the physical volume currently being evaluated is not the last physical volume then the process proceeds to step 202, wherein the VTS obtains the next physical volume to evaluate.

The process continues as described until all of the physical volumes within all the pools have been evaluated. Once all the physical volumes in all of the pools have been evaluated the process continues to step 216 in which the physical volumes are sorted by remaining time.

In step 218, in response to the sorting of the physical volumes based on the remaining time, the VTS (or a processor (not shown) within the VTS) sends a command to the drive to secure data erase the physical volume with the least or shortest amount of remaining time. As used herein the shortest amount of remaining time is the calculated time remaining with the smallest difference between the current date (e.g. today's date and/or time) to the secure data erasure (SDE) deadline. The drive performs the secure data erase by overwriting all data of the physical volume one or more times utilizing a predetermined file or data pattern (e.g., logical ones, zeroes, some combination thereof). Once the secure data erase is performed the drive sends a response to the VTS (e.g. to the HSM client via the storage management server) indicating the secure data erase has been performed. If however, the drive does not respond that the secure data erase has been performed then the physical volume will remain in the queue of physical volumes to be secure data erased. In the case where there are more physical volumes that are currently expired, are available for secure data erasure, and that have a remaining time that is less than the customer defined time threshold, the VTS will continue to secure data erase the next physical volume with the least or shortest remaining time until all physical volumes that are currently expired, are available for secure data erasure, and that have a remaining time that is less than the customer defined time threshold are secure data erased.

As discussed above, the automated storage management administrator 128 stores information associated with the physical volumes in an associated volume status table (not shown). The volume status table (not shown) lists each of the physical volumes in the system and includes one or more parameters associated with the physical volume. In one embodiment, the volume status table may contain one or more of the following: the expiration date for each physical volume; the time interval (i.e. grace period) for each physical volume; the secure data erase (SDE) deadline for each physical volume; remaining time (calculated in step 208); and the number or quantity of secure data erasures queued (as counted and determined in step 212). The volume status table may be updated periodically, e.g., each time the process is initiated, to maintain current parameters associated with each physical volume. The volume status table may also have additional information which would be helpful in the secure data erase process as understood by one of ordinary skill in the art.

Each of the blocks of the flow diagram of FIG. 2, and those depicted in subsequent figures, may be executed by a module (e.g., a software module) or a portion of a module or a computer system. The methods described herein, the operations thereof and modules for performing such methods may therefore be executed on a computer system configured to execute the operations of the method and/or may be executed from computer-readable media. The method may be embodied in a machine-readable and/or computer-readable medium for configuring a computer system to execute the method. The software modules may be stored within and/or transmitted to a computer system memory to configure the computer system to perform the functions of the module. Alternatively, such actions may be embodied in the structure of circuitry that implements such functionality, such as the micro-code of a complex instruction set computer (CISC) or reduced instruction set computer (RISC), firmware programmed into programmable or erasable/programmable devices, the configuration of a field-programmable gate array (FPGA), the design of a gate array or full-custom application-specific integrated circuit (ASIC), or the like.

Those skilled in the art will also recognize that the boundaries between modules and operations depicted herein are merely illustrative and alternative embodiments may merge such modules or operations, or impose an alternative decomposition of functionality thereon. For example, the actions discussed herein may be decomposed into sub-operations to be executed as multiple computer processes. Moreover, alternative embodiments may combine multiple instances of a particular operation or sub-operation. Furthermore, those skilled in the art will recognize that the operations described in exemplary embodiment are for illustration only. Operations may be combined or the functionality of the operations may be distributed in additional operations in accordance with the disclosure. As will also be apparent to those of skill in the art, methods for determining delay and jitter described herein may employ other techniques (similar in effect to those described herein) to make such determinations, and such alternative techniques are intended to be comprehended by the methods and apparati discussed herein.

FIG. 3 illustrates a process flow diagram in which additional resources (e.g. tape drive(s)) may be allocated to perform the secure data erase, or alternatively, one or more existing tape drives (tape drives allocated to the secure data erase process) may be reallocated such that one or more previous additional allocated resources (e.g. tape drive(s)) may be removed, one or more additional resources (e.g. tape drive(s)) may be added, or the resources may be set back to the minimum requirement. The addition of tape drive resources is determined based on whether allocating the additional tape drive(s) would improve the secure data erase performance. An improvement may be the ability of the tape management system (e.g. VTS) to perform the secure data erasure before the secure data erasure deadline as described further below. The removal of tape drive resources is determined based on whether or not the secure data erase process would be able to operate and meet the secure data erase deadline(s) with fewer tape drives or with the number of tape drives allocated for minimum operating requirements.

As discussed above with respect to step 212 an incremental count of the number or quantity of physical volumes that are currently expired, are available for secure data erasure, and have a remaining time that is less than the customer defined time threshold may be kept. In other embodiments a count of physical volumes to be secure data erased may be obtained by other methods. The count of physical volumes that are currently expired, are available for secure data erasure, and have a remaining time less than the customer defined time threshold defines the number or quantity of secure data erase operations that are queued.

FIG. 3 illustrates flow diagram of a method to evaluate the allocation of resources (e.g. tape drive(s)) for secure data erase in accordance with an embodiment of the present disclosure. For purposes of discussion, it is assumed that this process is code executed by the VTS upon a request for a secure data erase, upon a customer request, or on a periodic basis (e.g., every 24 hours, every 12 hours, or any granularity as appropriate). The process flow begins at step 301 and flows to step 302. As illustrated in step 302, the VTS compares the number or quantity of secure data erase operations that are queued against a maximum queued threshold. The maximum queued threshold may be defined by the customer. For example, the customer may determine the maximum queued threshold as the quantity of physical volumes that the VTS system, with the current resources could successfully secure data erase without exceeding a secure data erase deadline. For example the customer may define the maximum queued threshold to be 15 physical volumes.

If the quantity of secure data erase operations that are queued (for example, 16) are greater than the maximum queued threshold then the process continues to step 306. In step 306 the average time to the customer secure data erase (SDE) deadline is calculated and compared to a minimum expiration threshold. The average time to SDE deadline is determined by summing the remaining time for each physical volume to the SDE deadline in the secure data erase queue and dividing the sum by the quantity of physical volumes in the secure data erase queue. The minimum expiration threshold may be defined by the customer. For example, the customer may determine and define the minimum expiration threshold by considering the minimum amount of time (e.g. number of days or hours) that the customer can reasonably expect the current allocation of secure data erase drives to be able to secure data erase the quantity of physical volumes queued before they reach the SDE deadline. If the average time to SDE deadline is greater than the minimum expiration threshold then the process ends at step 312 without allocating or removing any secure data erase resources. For example, if the average time to SDE deadline is 15 days, and the minimum expiration threshold has been set by the customer to 3 days then it would be expected that the current secure data erase resources (e.g. tape drives) are sufficient to secure data erase the queued physical volumes before the SDE deadline.

If the average time to customer SDE deadline is less than the minimum expiration threshold then the process continues to step 310 in which the VTS allocates more tape resources (e.g. tape drives) to complete the queued secure data erasure operations. For example, if the average time to SDE deadline is 1 day, and the minimum expiration threshold has been set by the customer to 3 days then it would be expected that the current secure data erase resources (e.g. tape drives) will not be able to meet the demand to secure data erase all the physical volumes within the secure data erase queue. In this example, the process would continue to step 310 and an additional tape drive would be allocated for the secure data erase process. After step 310 the process continues to step 312 where the process ends.

In one embodiment the VTS may allocate an additional tape drive(s) by recruiting one of the tape drives 110A, 110B . . . 110N to perform the overwriting process of secure data erase. The recruited tape drive (e.g. one of 110A, 110B . . . 110N) may have been previously used within the VTS to perform read and or write processes. Since the tape drive (e.g. one of 110A, 110B . . . 110N) is no longer able to perform those functions, the VTS system is now functioning with one less drive to perform read and write operations. Therefore, it is desirable to allocate only the additional resource (e.g. tape drive) when the additional resource is needed and to return the resource (e.g. tape drive) to its original function when the additional resource is no longer needed.

In another embodiment the VTS may allocate an additional tape drive to the secure data erase process by requesting an additional tape drive to be added to the tape library 112. The request may be communicated through an interface such a display or graphical user interface (GUI). In another embodiment one or more additional resources (e.g. tape drive(s)) may be allocated to perform the secure data erase.

Returning to step 302, if it is determined that the quantity of secure data erase operations that are queued are less than the maximum queued threshold the process continues to step 304. In step 304 the quantity of secure data erase operations is compared to a minimum queued threshold. The minimum queued threshold may be defined by the customer. The customer may determine and define the minimum queued threshold as the quantity of secure data erases that will likely be secure data erased before they have a chance of reaching the SDE deadline with the minimum operating requirements. If the quantity of secure data erase operations is less than the minimum queued threshold then the allocation of tape drives for the secure data erase process are set to the minimum operating requirements. In another embodiment, one or more existing tape drives (tape drives allocated to the secure data erase process) may be reallocated such that one or more previous additional allocated resources (e.g. tape drive(s)) may be removed. After step 308 the process ends at step 312.

If it is determined by the VTS that the quantity of secure data erase operations is greater than the minimum queued threshold then the current allocation of tape drive resources is maintained and the process ends at step 312.

In a further embodiment the allocation of tape drives for the secure data erase process may be performed at once, rather than in a piecemeal fashion as described above. The VTS system may determine the optimum number of tape drives for a secure data erase process by performing steps 302, 304, 306, 308, and 310 as previously described. Once the optimum number of drives is determined the VTS allocates the optimum number of drives for the secure data erase process as described above. The optimum number of tape drives for a secure data erase process is the minimum number of tape drives that are required to perform the secure data erasure before the secure data erasure deadline. The optimum number may be reevaluated at periodic intervals (e.g. on a daily basis, every 12 hours, or any granularity as appropriate).

FIG. 2 and FIG. 3 illustrate a flow diagram of the secure data erase process according to an embodiment of the present disclosure. Although the flow diagrams depicted in FIG. 2 and FIG. 3 indicate a particular order of operations and a specific granularity of process operations in alternative embodiments the illustrated order may be varied (e.g., process operations may be performed in another order or performed substantially in parallel) and one or more of the process operations may be coalesced or fragmented). Similarly, additional process operations may be added where necessary in alternative embodiments of the present disclosure.

As discussed above, the automated storage management administrator 128 stores information associated with the physical volumes in an associated volume status table (not shown). The volume status table lists each of the physical volumes in the system and includes one or more parameters associated with the physical volume. In one embodiment, the volume status table may contain one or more of the following: the number of secure data erasures queued (as determined in step 212); and/or the average time to SDE deadline. This volume status table may be combined with the volume status table described above with respect to FIG. 2, or the volume status table may be created as a separate table. The volume status table may be updated periodically, e.g., each time the process of FIG. 2 and/or FIG. 3 is initiated, to maintain current parameters associated with each physical volume. The volume status table may also have additional information which would be helpful in the secure data erase process as understood by one of ordinary skill in the art.

Figure 4:
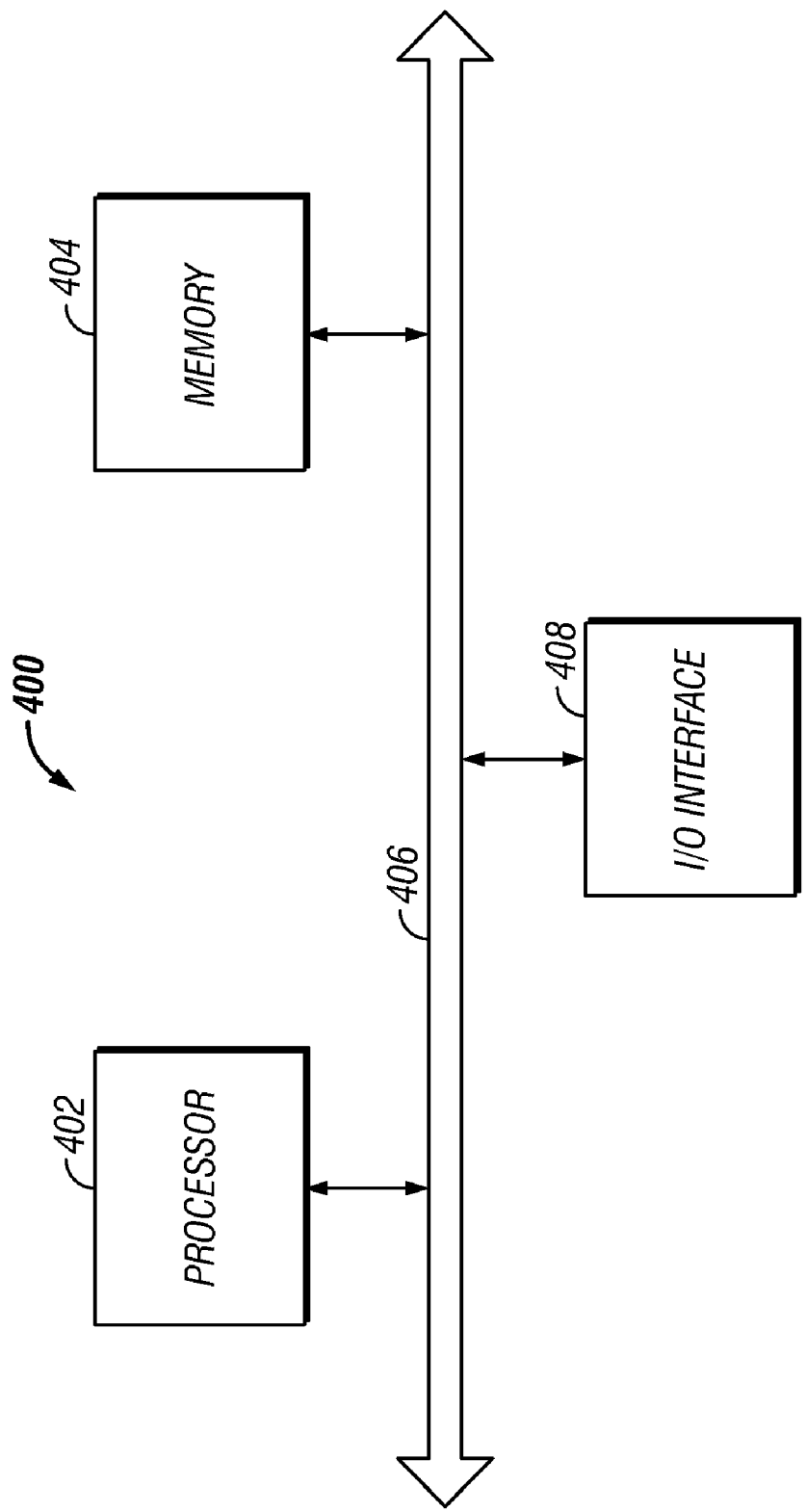
FIG. 4 illustrates a data processing system useable with one or more embodiments of the present disclosure.

FIG. 4 illustrates a data processing system useable with one or more embodiments of the present disclosure. While a particular number and arrangement of elements have been illustrated with respect to data processing system 400 of FIG. 4, it should be appreciated that embodiments of the present disclosure are not limited to data processing systems having any particular number, type, or arrangement of components and so many encompass a wide variety of data processing system types, architectures, and form factors (e.g., network elements or nodes, personal computers, workstations, servers, or the like). Data processing system 400 of the illustrated embodiment includes a processor 402 coupled to a memory 404 utilizing a bus 406. Memory 404 may comprise any of a number of system memory-type storage elements such as random access memory (RAM), read-only memory (ROM), flash memory, and cache.

Data processing system 400 of the illustrated embodiment further comprises an input/output (I/O) interface 408 coupled to bus 406 to communicatively couple one or more I/O devices (not shown) to data processing system 400. Exemplary I/O devices may include traditional I/O devices such as keyboards, displays, printers, cursor control devices (e.g., trackballs, mice, tablets, etc.), speakers, and microphones; storage devices such as fixed or "hard" magnetic media storage devices, optical storage devices (e.g., CD or DVD ROMs), solid state storage devices (e.g., USB, Secure Digital SD™, CompactFlash™, MMC, or the like), removable magnetic medium storage devices such as floppy disks and tape, or other storage devices or mediums; and wired or wireless communication devices or media (e.g., communication networks accessed via modem or direct network interface).

Embodiments of the present disclosure may include software, information processing hardware, and various processing operations further described herein. The features and process operations of the present disclosure may be embodied in executable instructions embodied within a machine-readable medium such as memory 404, a storage device, a communication device or medium, or the like. A machine-readable medium may include any mechanism that provides (i.e., stores and/or transmits) data in a form readable by a machine (e.g., data processing system 400). For example, a machine-readable medium includes but is not limited to: random access memory (RAM); read only memory (ROM); magnetic storage media; optical storage media; flash memory devices; electrical, optical, and/or acoustical propagated signals (e.g., carrier waves, infrared signals, digital signals, etc.); or the like. The described executable instructions can be used to cause a general or special purpose processor such as processor 402, programmed with the instructions, to perform operations, methods or processes of the present disclosure. Alternatively, the features or operations of the present disclosure may be performed by specific hardware components that contain hard-wired logic for performing the operations, or by any combination of programmed data processing components and custom hardware components.

The present disclosure has been described in the context of fully functional data processing system; however, those skilled in the art will appreciate that the present disclosure is capable of being distributed as a program product in a variety of forms and applies equally regardless of the particular type of signal bearing media used to carry out the distribution. Examples of such signal bearing media include recordable media such as floppy disks and CD-ROM, transmission type media such as digital and analog communications links, as well as media storage and distribution systems developed in the future. Embodiments of the present disclosure may similarly be implemented utilizing software modules used to perform certain operations or tasks. The described software modules may include script, batch, or other executable files and may be stored on a machine-readable or computer-readable medium. Thus, the modules may be stored within a computer system memory to configure a data processing or computer system to perform one or more functions of a software module. Other new and various types of machine or computer-readable storage media may be used to store the modules discussed herein.

While particular embodiments of the present invention have been shown and described, it will be obvious to those skilled in the art that, based upon the teachings herein changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method comprising:
    receiving a request to perform a secure data erase process in a tape management system, said tape management system having a plurality of tape drives;
    in response to said request, determining whether allocating an additional tape drive would improve secure data erase performance, said determining comprising an evaluation of a quantity of physical volumes to be secure data erased, a maximum queued threshold, an average time to an erasure deadline, and a minimum expiration threshold; and
    in response to said determining that allocating an additional tape drive would improve said secure data erase performance, allocating an additional tape drive for said secure data erase process;
    wherein said secure data erase process comprises overwriting data of said physical volume.

2. The method of claim 1, wherein said evaluation further comprises:
    comparing said quantity of physical volumes to be secure data erased to said maximum queued threshold; and
    in response to said quantity of physical volumes to be secure data erased being greater than said maximum queued threshold, calculating said average time to said erasure deadline.

3. The method of claim 2, wherein said evaluation further comprises:
  comparing said average time to said erasure deadline to said minimum expiration threshold; and
  in response to said average time to said erasure deadline being less than said minimum expiration threshold, performing said step of allocating an additional tape drive to said secure data erase process.

4. The method of claim 1, wherein said quantity of physical volumes to be secure data erased is determined by a physical volume erase count, wherein said physical volume erase count is determined by incrementing a count for each physical volume that has a remaining time less than a time threshold.

5. The method of claim 4, wherein said remaining time is calculated by a difference between said erasure deadline of said physical volume and a current date of said physical volume.

6. The method of claim 1, wherein said overwriting comprises overwriting said data of said physical volume one or more times utilizing a data pattern that contains one of logical ones, zeroes, or some combination thereof.

7. The method of claim 1, further comprising reallocating one or more of said plurality of tape drives that are allocated for the secure data erase process in response to another evaluation of said quantity of physical volumes to be secure data erased, said maximum queued threshold, and a minimum queued threshold.

8. The method of claim 1, wherein said improved secure data erase performance comprises performing said secure data erasure before said erasure deadline.

9. A method comprising:
  determining a number of tape drives for a secure data erase process, said determining comprising an evaluation of a quantity of physical volumes to be secure data erased, a maximum queued threshold, an average time to an erasure deadline, and a minimum expiration threshold; and
  in response to said determining said number of tape drives, allocating said number of tape drives for said secure data erase process;
  wherein said secure data erase process comprises overwriting data of said physical volume.

10. A computer program product comprising a computer useable medium comprising:
  a computer readable program wherein said computer readable program when executed on a computer causes the computer to:
  in response to a tape management system receiving a request to perform a secure data erase process, determine whether an allocation of an additional tape drive would improve secure data erase performance, said determination comprising an evaluation of a quantity of physical volumes to be secure data erased, a maximum queued threshold, an average time to an erasure deadline, and a minimum expiration threshold; and
  in response to said determination that said allocation of an additional tape drive would improve said secure data erase performance, allocate an additional tape drive for said secure data erase process;
  wherein said secure data erase process comprises overwriting data of said physical volume.

11. The computer program product of claim 10, further configured to:
  compare said quantity of physical volumes to be secure data erased to said maximum queued threshold; and
  calculate said average time to said erasure deadline in response to said quantity of physical volumes to be secure data erased being greater than said maximum queued threshold.

12. The computer program product of claim 11, further configured to:
  compare said average time to said erasure deadline to said minimum expiration threshold; and
  allocate said additional tape drive to said secure data erase process in response to said average time to said erasure deadline being less than said minimum expiration threshold.

13. The computer program product of claim 10, wherein said quantity of physical volumes to be secure data erased is determined by a physical volume erase count, wherein said physical volume erase count is determined by incrementing a count for each physical volume that has a remaining time less than a time threshold.

14. The computer program product of claim 13, further configured to determine said remaining time by calculating a difference between said erasure deadline of said physical volume and a current date of said physical volume.

15. The computer program product of claim 10 wherein said overwriting comprises overwriting said data of said physical volume one or more times utilizing a data pattern that contains one of logical ones, zeroes, or some combination thereof.

16. The computer program product of claim 10, further configured to reallocate one or more of said plurality of tape drives that are allocated for said secure data erase process in response to another evaluation of said quantity of physical volumes to be secure data erased, said maximum queued threshold, and a minimum queued threshold.

17. The computer program product of claim 10, wherein said improved secure data erase performance comprises performing said secure data erasure before said erasure deadline.

* * * * *